J. T. TAYLOR.
BOX BULL AND CALF WHEEL GUDGEON.
APPLICATION FILED APR. 28, 1921.
1,385,026.
Patented July 19, 1921.
2 SHEETS—SHEET 1.
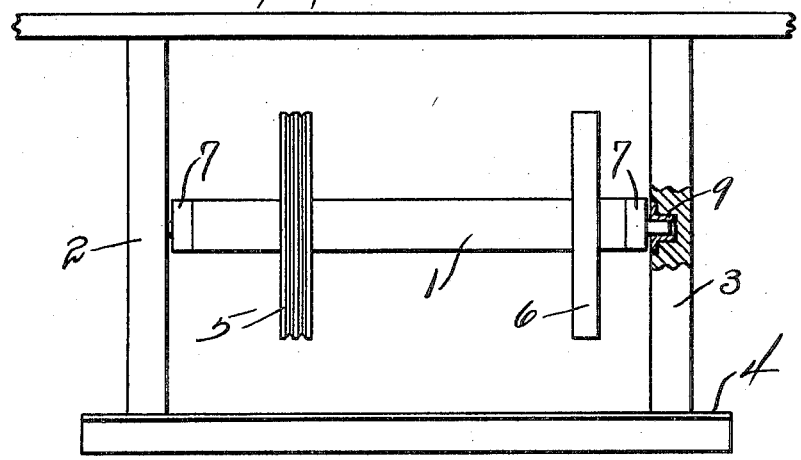
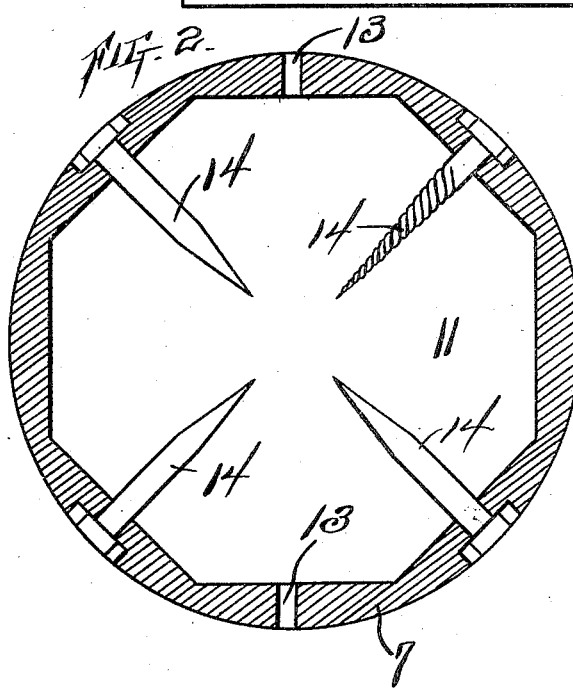
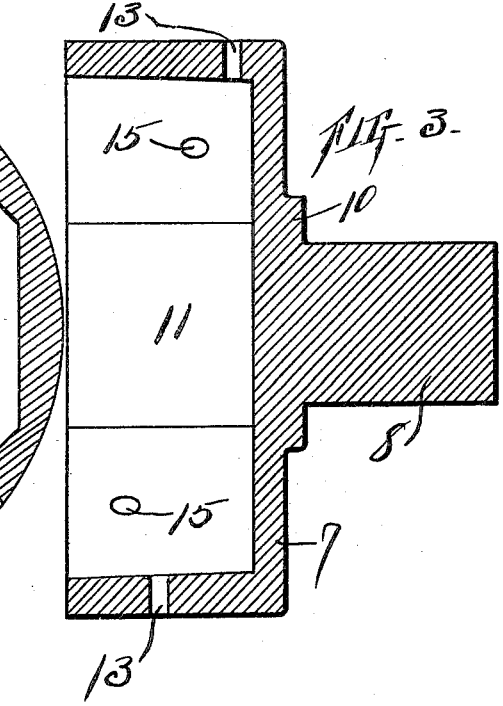
Inventor
JAMES T. TAYLOR
By A. L. Jackson
Attorney

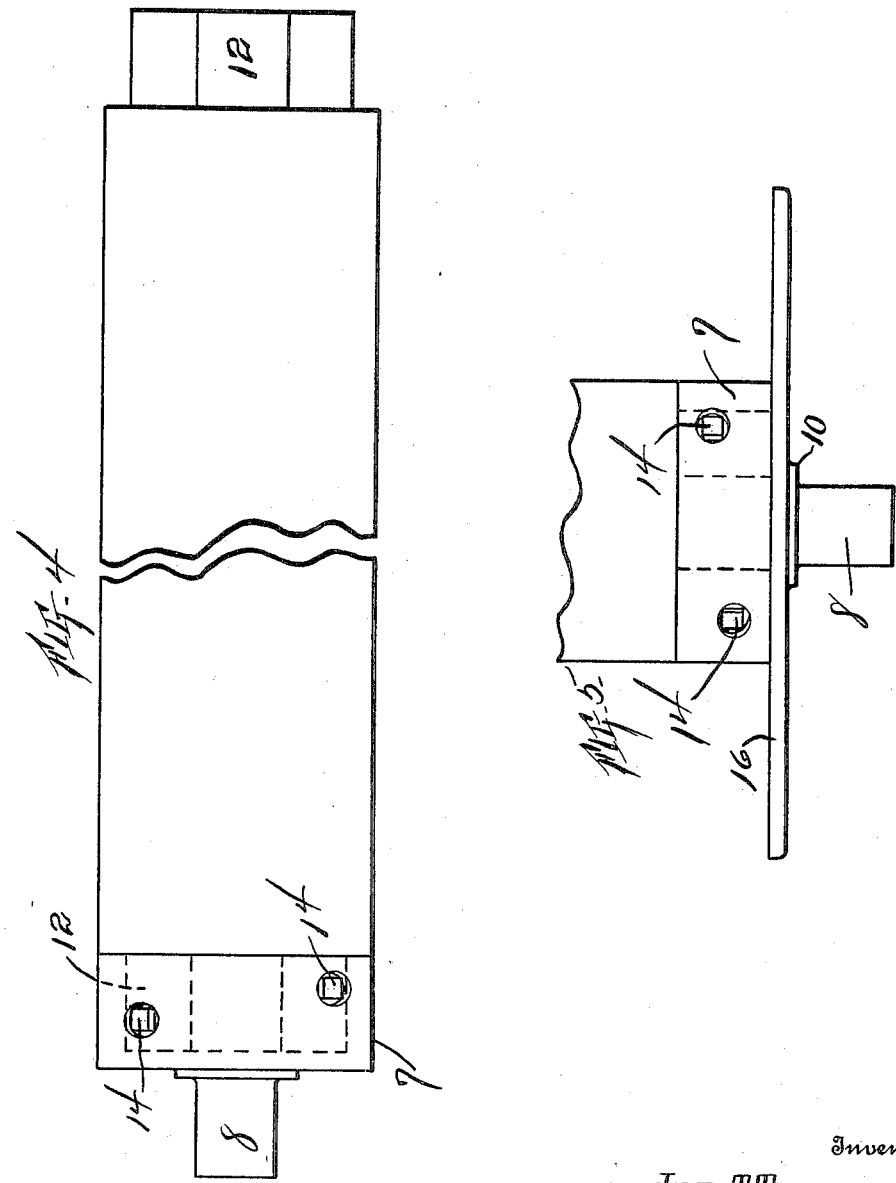

UNITED STATES PATENT OFFICE.

JAMES THOMAS TAYLOR, OF FORT WORTH, TEXAS.

BOX BULL AND CALF WHEEL GUDGEON.

1,385,026. Specification of Letters Patent. Patented July 19, 1921.

Application filed April 28, 1921. Serial No. 465,337.

*To all whom it may concern:*

Be it known that I, JAMES T. TAYLOR, a citizen of the United States of America, residing at Fort Worth, in the county of Tarrant and State of Texas, have invented certain new and useful Improvements in Box Bull and Calf Wheel Gudgeons, of which the following is a specification.

My invention relates to box calf and bull wheel gudgeons and more particularly to certain protecting and strengthening means; and the object is to provide means for preventing various troubles encountered in drilling oil and other wells. The shafts of the bull wheels are usually large oak timbers cut to a cross-section of eighteen inches square and then turned to cylindrical form. These shafts develop season cracks and when such cracks develop on the sides and both ends, the shafts cannot be used. And such shafts, after they are installed, frequently develop seasoning cracks in actual service and these cracks with the gudgeons now in use render the shafts worthless because the gudgeons become loose on the ends of the shafts. In such condition, the shafts have to be removed and the cost of each shaft removed is considerable because of the expense of the shaft itself,—about $300.00, and the loss of time. Also frequently such condition causes the shaft to break loose entirely from its bearings and this causes thousands of dollars damage to the tools, well, and derrick. One advantage of my invention is that the timbers can be used notwithstanding the seasoning cracks because it will be impossible for the gudgeons to become loose on the ends of the shafts. The improved gudgeon makes it possible to obtain the full strength of the shaft, and the improved gudgeon makes it possible to use shafts which have been discarded on account of the seasoning cracks. Other objects and advantages will be fully explained in the following description and the invention will be more particularly pointed out in the claims.

Reference is had to the accompanying drawings which form a part of this application.

Figure 1 is a side elevation, showing the improved gudgeons applied to a shaft. Fig. 2 is a vertical section of a gudgeon, showing the position of the lag screws and showing the interior contour of the gudgeon. Fig. 3 is a longitudinal section of a gudgeon. Fig. 4 is a side elevation of a shaft with one gudgeon thereon and the other removed. Fig. 5 is a side view of a calf or flanged gudgeon.

Similar characters of reference are used to indicate the same parts throughout the several views.

The drawings show the shaft 1 which is journaled in the uprights 2 and 3 which are mounted on the floor 4 of a derrick. A tug wheel 5 and a brake band wheel 6 are shown carried by the shaft 1. Gudgeons 7 are shown on the ends of the shaft 1. The gudgeons have journals 8 which run in bearings 9 which are countersunk in the uprights 2 and 3. The gudgeons are strengthened by cylindrical bosses 10 formed centrally on the exterior of the gudgeons. These bosses strengthen that part of the gudgeon which carries the journal 8. The gudgeons have octagon cavities 11 for receiving the octagon-shaped ends 12 of the shaft 1. The exterior of the gudgeons is cylindrical. This form adds great strength and when the octagon-shaped end of the shaft is inserted in the octagon-shaped cavity 11, there can be no slipping or turning of the shaft without the gudgeon. Another advantage of this form of gudgeon is that less of the wood has to be cut from the shaft and the flat surfaces of the shaft are smaller and would not have large season cracks if any at all. The octagon shape makes the liability of moving of the shaft less if there should be shrinkage of the wood. If there should be any shrinkage, Babbitt metal may be used to fill up the space left vacant by the shrinkage or other cause. Holes 13 may be made at any convenient place for inserting the Babbitt metal which can be poured in and the opening should be near enough toward the end of the shaft so that the metal can find its way down between the end of the shaft and the bottom of the gudgeon. The gudgeons may be held in place, if necessary, by lag screws 14 and these screws may be staggered with their heads countersunk in the outer periphery of the gudgeon. The lag screws are driven through holes 15.

The form of gudgeon shown in Fig. 5 has a flange 16 which may serve as a brace or strengthening means for the gudgeon.

The gudgeon shown may be used on other shafts or windlasses to great advantage. The practical use of the gudgeons in oil fields has demonstrated the efficiency of the gudgeons and that the gudgeons prolong the life or wear of the shafts, thereby effecting a saving in reconstruction and preventing loss of time on account of breakdowns.

The gudgeons will be automatically tightened when they are forced on the ends of the shaft because the cavities have the walls thereof slightly converging toward the bottoms of the cavities.

What I claim, is,—

1. A bull and calf wheel shaft gudgeon comprising a single casting having a polygonal shaped cavity for receiving the end of a shaft having the end thereof polygonal in shape and having a cylindrical periphery countersunk in and flush with the surface of said shaft and having a journal formed integral with the closed end of said gudgeon, the end of said shaft being imperforate, and means projected through the sides of the gudgeon for attaching the gudgeon to the shaft.

2. A bull and calf wheel shaft gudgeon comprising a cylindrical body and having a journal formed on one end and having a polygonal cavity in the other end, the walls of which are tapering to the body of the cavity, and the body having perforations in the sides leading to said cavity for injecting a liquid element to take up shrinkage by turning to a solid in said cavity.

3. A bull and calf wheel shaft gudgeon comprising the combination of a cylindrical shaft having the ends thereof polygonal in cross-section shape and a gudgeon for each end of the shaft having a cylindrical body countersunk in the surface of said shaft and having a polygonal shaped cavity receiving the end of the shaft.

4. A bull and calf wheel shaft gudgeon comprising the combination of a cylindrical shaft having the ends thereof octagon shaped in cross-section and gudgeons for each end of the shaft, each gudgeon having a cylindrical body countersunk in the surface of said shaft and having an octagon shaped cavity therein to receive the end of said shaft, the walls of said cavity tapering from the open to the bottom of the cavity, and said gudgeon having a journal formed on the closed end thereof, and lag screws for holding the gudgeons on the ends of the shaft.

5. A bull and calf wheel shaft gudgeon comprising the combination of a cylindrical shaft having the ends thereof octagon-shaped in cross-section, gudgeons for said shaft, each gudgeon having a cylindrical body countersunk in the surface of said shaft and having a journal formed on the open end thereof and an octagon-shaped cavity for receiving the end of the shaft and tapering from the end to the bottom of the cavity for wedging the shaft therein and having perforations for receiving a wedging material.

In testimony whereof, I set my hand, this 25th day of April, A. D. 1921.

JAMES THOMAS TAYLOR.